United States Patent [19]

Hayasaka

[11] Patent Number: 5,076,113
[45] Date of Patent: Dec. 31, 1991

[54] SHIFTING DEVICE FOR MARINE PROPULSION UNIT

[75] Inventor: Kenichi Hayasaka, Hamamatsu, Japan

[73] Assignee: Sanshin Kogyo Kabushiki Kaisha, Hamamatsu, Japan

[21] Appl. No.: 595,659

[22] Filed: Oct. 9, 1990

Related U.S. Application Data

[63] Continuation of Ser. No. 276,061, Nov. 25, 1988, abandoned.

[30] Foreign Application Priority Data

Nov. 26, 1987 [JP] Japan ................... 62-298806

[51] Int. Cl.[5] ........................................ G05G 11/00
[52] U.S. Cl. ..................... 74/480 B; 440/86
[58] Field of Search ............ 440/86; 74/480.3, 473 R, 74/96; 192/995

[56] References Cited

U.S. PATENT DOCUMENTS

| | | | |
|---|---|---|---|
| 2,729,186 | 1/1956 | Kloss | 440/86 X |
| 4,195,534 | 4/1980 | Prince | 74/480 B X |
| 4,262,622 | 4/1981 | Dretzka et al. | 440/86 X |
| 4,632,232 | 12/1986 | Kolb et al. | 74/480 B X |
| 4,767,365 | 8/1988 | Nakahama et al. | 440/86 X |
| 4,838,822 | 6/1989 | Friedle et al. | 440/86 |

FOREIGN PATENT DOCUMENTS

| | | | |
|---|---|---|---|
| 126289 | 7/1983 | Japan | 440/86 |
| 2168022 | 6/1986 | United Kingdom | 440/86 |

Primary Examiner—Peter A. Aschenbrenner
Attorney, Agent, or Firm—Ernest A. Beutler

[57] ABSTRACT

An improved shifting mechanism for a transmission incorporating a dog clutch wherein a motion transmitting mechanism is interposed between the shift operator and the dog clutch for effecting initial rapid movement of the dog clutch from its neutral position to its drive position upon initial movement of the shift lever from its neutral position toward its drive position and then a slower more positive movement to final engagement.

7 Claims, 3 Drawing Sheets

SHIFTING DEVICE FOR MARINE PROPULSION UNIT

This is a continuation of U.S. Pat. application Ser. No. 276,061, filed Nov. 25, 1988.

BACKGROUND OF THE INVENTION

This invention relates to a shifting device for a marine propulsion unit and more particularly to an improved shifting mechanism for shifting the dog clutches of a transmission.

In many forms of transmission, a dog clutch is employed for clutching a gear to a shaft to achieve the transmission of power. This type of transmission is frequently employed in marine propulsion units such as the forward, neutral, reverse transmission of the outboard drive portion of an inboard/outboard drive or in the lower unit of an outboard motor per se, such units being referred to generally as marine outboard drives. In connection with this type of transmission, a driving bevel gear is enmeshed with a pair of counterrotating driven bevel gears that are journaled on an output shaft. A dog clutching mechanism is incorporated on this output shaft and is selectively engageable with either of the driven gears so as to drive the output shaft in selected forward or reverse directions. This type of mechanism has considerable advantages in that it can transmit relatively high driving thrusts and also provides a simplicity in construction.

Although there are the aforenoted advantages, the use of dog clutches does present some disadvantages. For example, it is desirable that the dog clutching teeth be brought into rapid and firm engagement so as to minimize wear and chattering and other noise as may occur when shifting is being done. Various arrangements have been incorporated in the shifting mechanism including detents and biasing springs for insuring snap engagement of the dog clutching elements. Although these devices do improve the engagement, further improvement is possible.

It is, therefore, a principal object of this invention to provide an improved shifting device for a marine propulsion unit.

It is a further object of this invention to provide an improved shifting device for insuring smooth and efficient operation of the dog clutching elements of a transmission.

It is a further object of this invention to provide an improved shifting device for the dog clutching elements of a transmission wherein the dog clutching teeth are brought into proper and firm engagement.

One of the disadvantages with previously proposed shifting arrangements is that the transmission of motion between the operator shift control and the dog clutching element provides a relatively linear action. That is, the dog clutching element moves in exactly the same relationship to the shift control during its full range of travel. However, the actual shifting movement that provides the optimum result is somewhat different. That is, it is desirable to provide a high rate of travel during the initial movement of the shift control so that the dog clutching element will be brought rapidly toward engagement with its corresponding element. However, as the shift is completed, it is desirable to reduce the speed of travel and increase the force that is exerted to the dog clutching element.

It is, therefore, a still further object of this invention to provide an improved shifting linkage and operator for a dog clutched transmission that will provide the desired motion relationship.

SUMMARY OF THE INVENTION

This invention is adapted to be embodied in a shifting mechanism for operating the dog clutch of a transmission between a neutral and a drive condition in response to the operation of an operator controlled shift selector from a neutral position to an engaged position. Motion transmitting means are interposed between the shift selector and the dog clutch for effecting more rapid movement of the dog clutch from its neutral condition to its drive position in response to initial movement of the shift selector from its neutral position and then slower movement of the dog clutch to its drive position upon continued movement of the shift selector to its engaged position.

DETAILED DESCRIPTION OF THE PREFERRED EMBODIMENT OF THE INVENTION

Figure 1:
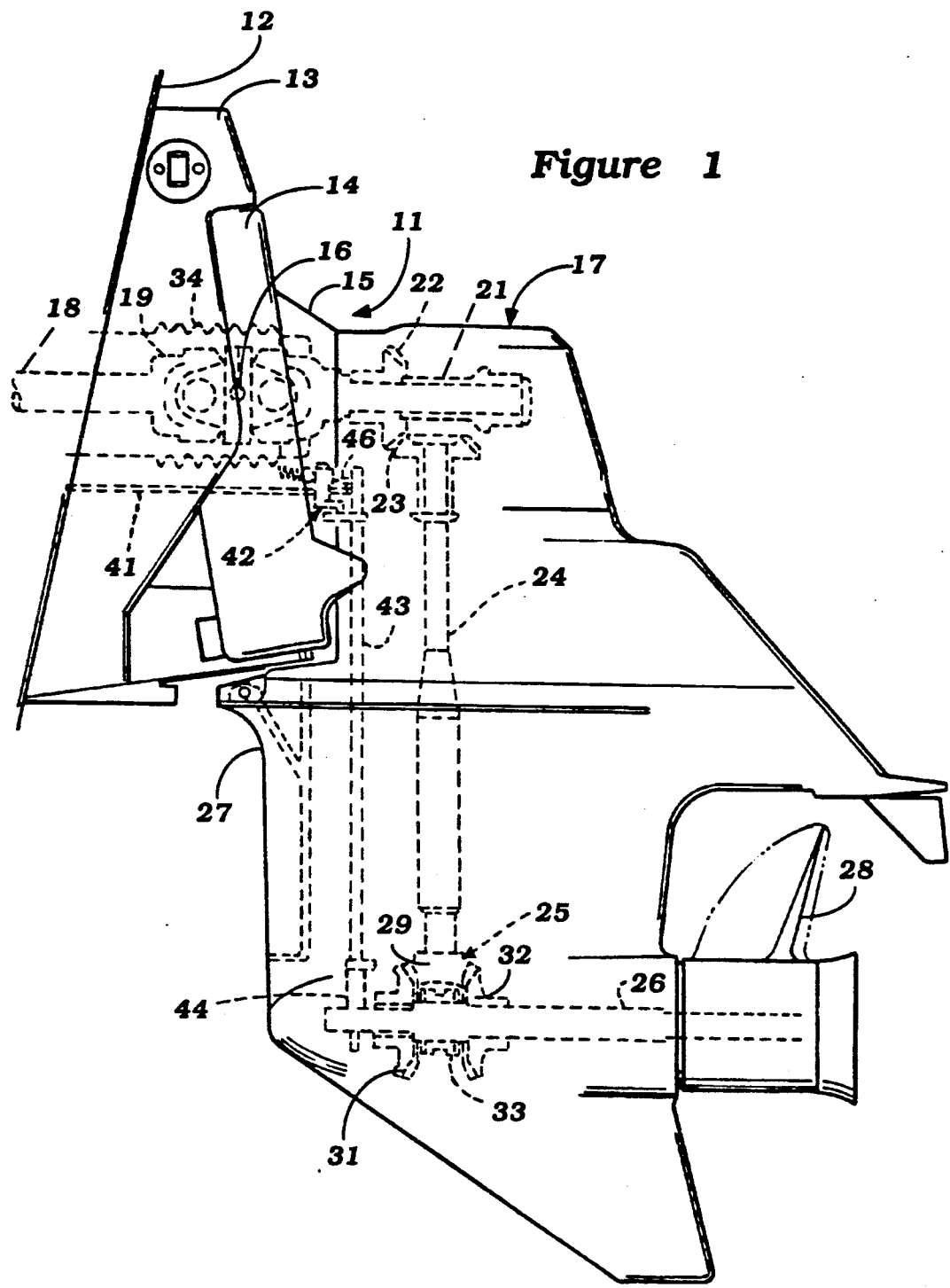
FIG. 1 is a side elevational view of a marine outboard drive constructed in accordance with an embodiment of the invention.

Referring now in detail to the drawings and initially primarily to FIG. 1, a marine outboard drive constructed in accordance with an embodiment of the invention is identified generally by the reference numeral 11. The invention is described in conjunction with the outboard drive portion of an inboard/outboard drive but, as has been noted, certain facets of the invention have similar utility in an outboard motor per se or, in fact, have utility in other types of transmissions.

The outboard drive 11 is adapted to be utilized in conjunction with an associated watercraft, the transom of which is identified at 12. A transom plate or gimbal housing 13 of the outboard drive 11 is affixed in a known manner to the transom 12 and supports a gimbal ring 14 for steering movement about a generally vertically extending axis. A housing portion 15 of the outboard drive unit 11 is connected to the gimbal ring 14 for tilting movement about a generally horizontally extending axis defined by a pair of gimbal pins 16 so that the angular position of a main housing 17 of the outboard drive unit may be adjusted to various trim adjusted positions and to a tilted up, out of the water position.

An engine driven output shaft 18 is driven by an inboard position engine (not shown) and extends through a suitable opening in the transom 12. A universal joint connection 19 interconnects the driving shaft 18 to a driven shaft 21 that is journaled within the housing 17 in a known manner. A bevel gear 22 is affixed for rotation with the shaft 21 and is enmeshed with a driven bevel gear 23 that is non rotatably affixed to the upper end of a drive shaft 24. The drive shaft 24 is suitably journaled for rotation about a generally vertically extending axis within the housing 17 in a known manner.

A forward, neutral, reverse transmission, indicated generally by the reference numeral 25, is provided for selectively coupling the drive shaft 24 to a propeller shaft 26 that is journaled in a lower unit 27 of the housing 17. The propeller shaft 26 is journaled in a known manner and is affixed to a propeller 28 for powering the associated watercraft.

The forward, neutral, reverse transmission 25 is generally of a known type and includes a driving bevel gear 29 that is affixed to the lower end of the drive shaft 24. The driving bevel gear 29 is enmeshed with a pair of diametrically opposed driven bevel gears 31 and 32 so that the gears 31 and 32 will rotate in opposite directions as the drive shaft 24 rotates. The transmission 25 is completed by means of a dog clutching element 33 that has a splined connection to the propeller shaft 26 and which is axially moveable therealong for engagement of dog clutching teeth carried by it with corresponding dog clutching teeth of the driven gears 31 and 32 for selectively coupling either of these gears for rotation with the propeller shaft 26 for driving it in selected forward and reversed directions. In addition, the dog clutching sleeve 33 has a neutral position in which neither of the gears 31 or 32 is coupled to the shaft 26 and hence the drive shaft 24 can rotate without driving the propeller shaft 26. A detent mechanism (not shown) may be provided for yieldably retaining the dog clutching element 33 in any or all of its positions.

There is provided a flexible boot 34 that encircles the universal joint 19 and provides sealing between the transom 12 and the outboard drive unit.

The foregoing construction may be considered to be conventional and it is only the shifting mechanism that is employed for operating the dog clutching element 33 which differs from the prior art. For that reason, further description of the conventional details of the outboard drive 11 are not believed to be necessary to understand the invention and reference may be had to any of the conventional outboard drive constructions for details which form no part of the invention.

The invention relates primarily to the mechanism for transmitting motion between the operator controlled shift lever (not shown) that is moveable between an forward, neutral and reverse position and which operates a shift rod 41 and the dog clutching element 33. A motion transmitting mechanism, indicated generally by the reference numeral 42 and constructed in accordance with an embodiment of the invention is provided to operate a shift shaft 43 which, in turn, operates a cam mechanism contained within the lower unit and identified generally at 44 for moving the dog clutching element 33. The cam mechanism 44 may be considered to be conventional and it is the transmitting mechanism 42 which embodies the invention.

It has been discovered that conventional shift mechanisms do not achieve the desired rate of movement and relationship of movement of the dog clutching sleeve 33 relative to the shifting lever. That is, it has been found that more effective shifts can be accomplished if a transmitting mechanism 42 is provided that will achieve first initial rapid movement of the dog clutching sleeve 33 upon movement of the shift lever from its neutral position to either its forward or reverse positions and then a more gradual yet more forceful movement.

Figure 2:
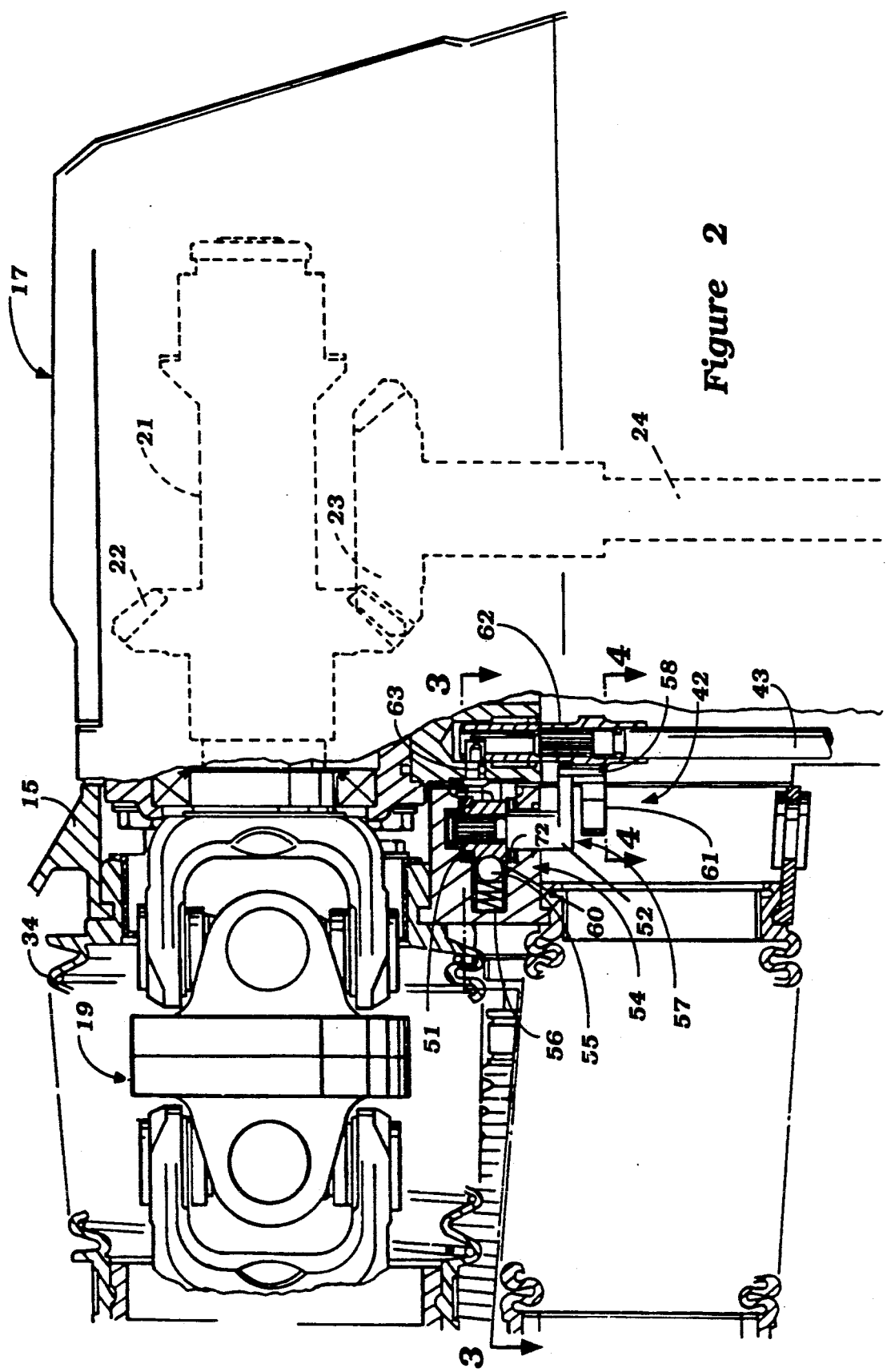
FIG. 2 is an enlarged view of the upper portion of the outboard drive, with a portion broken away so as to show in more detail the shifting mechanism.
Figure 3:
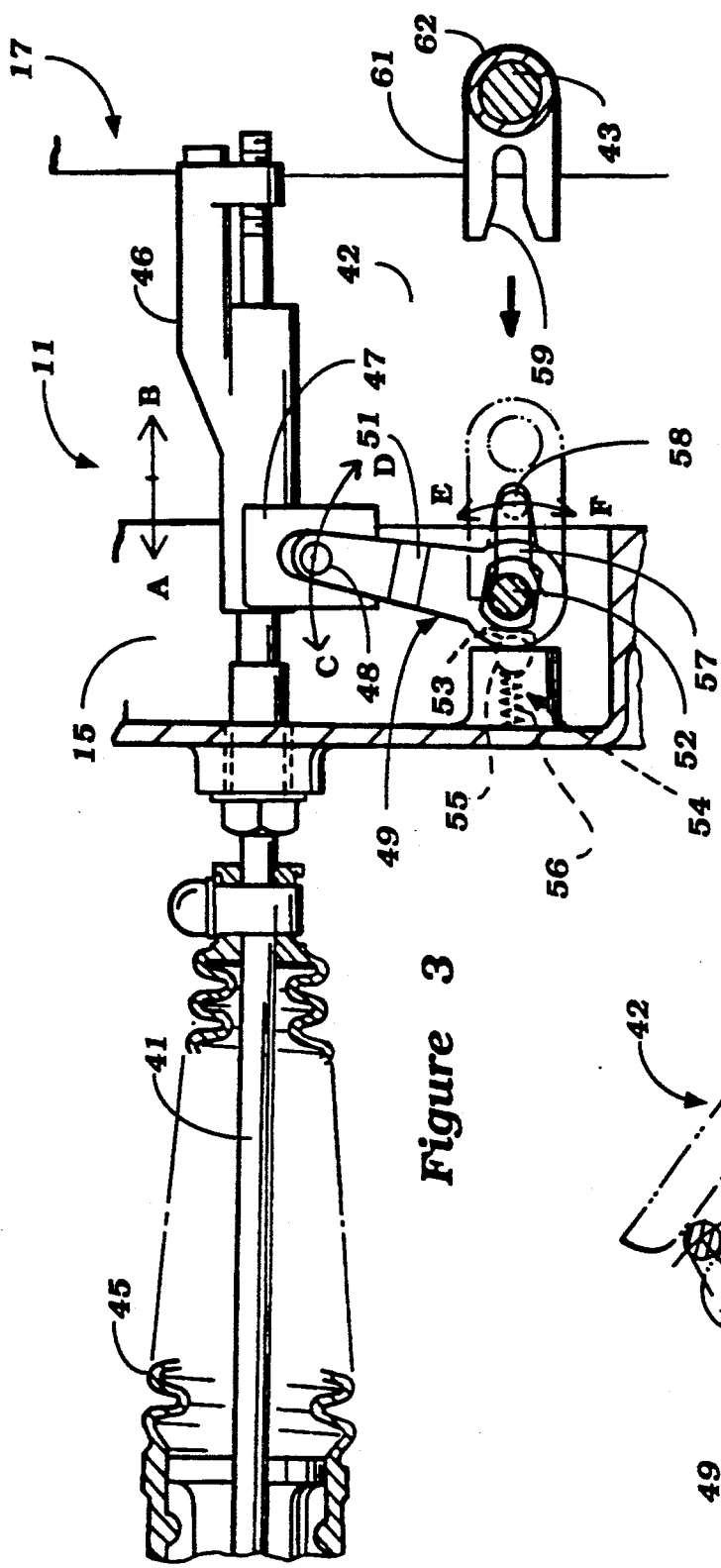
FIG. 3 is an partially exploded cross-sectional view taken along the line 3—3 of FIG. 2 and shows further details of the shifting mechanism.
Figure 4:
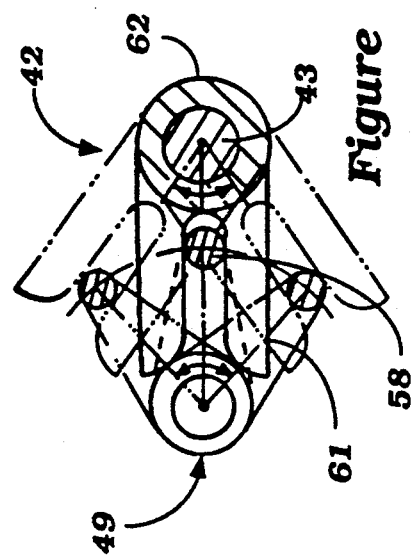
FIG. 4 is a still further enlarged top plan view of the shifting mechanism showing its various positions and the ratio of force transmission.

Referring now primarily to FIGS. 2 through 4, the shift actuating rod 41 is encircled within a flexible bellows 45 to effect sealing and is connected at its rearward end to an operating member 46. The operating member 46 has affixed to it a yoke 47 that is formed with a slot that is engaged by a pin or cam member 48 carried on a first lever 49. The lever 49 has a spline connection 50 to a shaft 52 having an arm portion 51. The first shaft 52 is journaled suitably in the housing 15. The lever 49 has a detent receptacle 53 that is normally engaged by a detent mechanism, indicated generally by the reference numeral 54 and comprised of a ball 55 and biasing spring 56 for retaining the lever 49 in the neutral position. The detent mechanism and specifically the ball 55 and spring 56 are supported in a sleeve 60 fixed in the housing assembly 17 in a suitable manner. The lever 49 may rotate either in the forward direction C or rearward direction D in response to reciprocation of the shift rod 41 in the directions A and B respectively.

The lever 49 is axially affixed to the shaft 52 between an antifriction bushing 71 and a snap ring 72 that is, in a suitable manner, affixed to the shaft 52. In this way, the lever 49 and associated detent mechanism serve to cooperate with the shaft 52 so as to hold the shaft 52 in the neutral position. If desired, further detent recesses may be formed in the lever 49 for retaining it in the forward and reverse positions also.

The shaft 50 is formed with a second lever 57 that has a pin 58 that is adapted to be received in a slot 59 formed in a third lever 61 which third lever has a hub portion 62 that is affixed by a spline connection to the upper end of the shift rod 43. A lock screw 63 axially fixes the lever 61 to the shift rod 43.

When the lever 49 swings in the direction C, the lever 57 will swing in the direction E, while when the lever 49 swings in the direction D, the lever 57 will swing in the direction F. It should be noted that the distance between the pivot pin 48 and the supporting shaft 52 is substantially greater than the distance between the pivot pin 58 and the shaft 52. As a result, a given angular movement of the pin 48 will be accompanied by a substantially smaller angular movement of the shaft 58. The geometry is such, as aforenoted, that the reciprocation of the shift rod 41 will cause initially rapid angular movement of the third lever 58 and shift rod 43. However, as the device moves over center, the geometry of the pin and slot connections will cause a smaller degree of angular movement. Hence the final shifting action of the shift lever 43 will be smaller but with a greater force. As a result, the shifting can be achieved quite effectively and without a great deal of chattering or noise.

It is to be understood that the foregoing description is that of a preferred embodiment of the invention and that various changes and modifications may be made without departing from the spirit and scope of the invention, as defined by the appended claims.

I claim:

1. A shifting mechanism for operating a dog clutch of a transmission between a neutral and a drive condition in response to the operation of an operator controlled shift selector from a neutral position to an engaged position, and motion transmitting means interposed between said shift selector and said dog clutch for effecting more rapid movement of said dog clutch from its neutral condition to its drive position in response to initial movement of said shift selector from its neutral position and then slower movement of said dog clutch to its drive position upon the completion of movement of said shift selector to its engaged position.

2. A shifting mechanism as set forth in claim 1 wherein the motion transmitting means transmits reciprocating motion to rotary motion.

3. A shifting mechanism as set forth in claim 2 wherein the motion transmitting means includes a cam and follower mechanism.

4. A shifting mechanism as set forth in claim 3 wherein the cam and follower mechanism comprises a fork supported for longitudinal movement and a pin affixed to a lever engaged within the fork and rotatably coupled to a shift rod for actuating the dog clutch.

5. A shifting mechanism as set forth in claim 1 wherein the motion transmitting means includes a cam and follower mechanism.

6. A shifting mechanism as set forth in claim 5 wherein the cam and follower mechanism comprises a fork supported for angular movement and a pin affixed to a lever engaged within the fork and rotatably coupled to a shift rod for actuating the dog clutch.

7. A shifting mechanism as set forth in claim 6 wherein a second lever is affixed for rotation with the first lever and carries a second pin engaged with a second fork that is affixed for rotation with the shift rod, the distance between the first mentioned pin and the pivotal support being less than the distance between the second pin and the pivotal support.

* * * * *

UNITED STATES PATENT AND TRADEMARK OFFICE
CERTIFICATE OF CORRECTION

PATENT NO. : 5,076,113

DATED : December 31, 1991   Page 1 of 2

INVENTOR(S) : Kenichi Hayasaka

It is certified that error appears in the above-identified patent and that said Letters Patent is hereby corrected as shown below:

Column 4, line 59, Claim 1, "for operating" should be --comprising--.

Column 4, lines 59-60, Claim 1, "of a transmission" should be --supported for movement--.

Column 4, line 60, Claim 1, after "condition" insert --,--.

Column 4, line 61, Claim 1, delete "in response to the operation of".

Column 4, line 62, Claim 1, after "selector" insert --movable--.

Column 4, line 64, Claim 1, after "for" insert --moving said dog clutch between its neutral position and its drive condition upon movement of said operator controlled shift selector in a non-linear relation with--.

Column 47, lines 64-65, Claim 1, delete "effecting".

Column 4, line 66, Claim 1, delete "to".

Column 4, line 66, Claim 1, "position" should be --condition--.

Column 4, line 66, Claim 1, "in response to" should be --upon--.

Column 5, line 1, Claim 1, "position" should be --condition--.

UNITED STATES PATENT AND TRADEMARK OFFICE
CERTIFICATE OF CORRECTION

PATENT NO. : 5,076,113

DATED : December 31, 1991

INVENTOR(S) : Kenichi Hayasaka

It is certified that error appears in the above-identified patent and that said Letters Patent is hereby corrected as shown below:

Column 5, line 6, Claim 2, after "motion" (first occurrence) insert --of said shift selector--.

Column 5, line 6, Claim 2, after "motion" (second occurrence) insert --of an element connected to said dog clutch--.

Signed and Sealed this

Eleventh Day of January, 1994

Attest:

BRUCE LEHMAN

*Attesting Officer*     *Commissioner of Patents and Trademarks*